3,361,724
POLYETHER ELASTOMER CONTAINING SULFUR CROSSLINKS AND THE METHOD FOR ITS PRODUCTION
James Watson and Frank Reeder, Coventry, England, assignors to Courtaulds Limited, London, England, a British company
No Drawing. Continuation of application Ser. No. 372,100, June 2, 1964. This application Jan. 20, 1967, Ser. No. 610,712
Claims priority, application Great Britain, June 4, 1963, 22,092/63; Oct. 3, 1963, 38,921/63
8 Claims. (Cl. 260—79.1)

ABSTRACT OF THE DISCLOSURE

An elastomer consisting essentially of a chain extended polyether cross-linked with sulphur.

This application is a continuation of our copending application Ser. No. 372,100, filed June 2, 1964, and now abandoned.

This invention concerns synthetic elastomers, that is synthetic polymers exhibiting long-range elasticity.

An elastomer according to the present invention comprises a substantially linear polymer having polyether segments linked by radicals, the radicals themselves being joined intermolecularly by linkages consisting of sulphur, so that the elastomer has a cross-linked structure.

The elastomer comprises units which may be represented by the following structural formula:

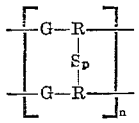

in which G represents the polyether segment, R the radical and $n$ and $p$ are integers.

The elastomer has a precursor in a linear polymer according to the formula:

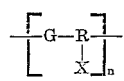

in which X is an ester group of an inorganic acid, for example Cl, Br, I or $MeSO_4$.

The linear polymer may be reacted with sodium sulphide which term includes sodium polysulphide, to produce the elastomer in which the ester groups of two radicals in different polymer molecules are replaced by a single sulphur atom or group of sulphur atoms.

The polyether segment may be derived from the polymerisation of a single cyclic ether having a 3, 4 or 5 membered ring, or from the copolymerisation of two or more such cyclic ethers. It appears that the best properties are developed in an elastomer when the segments consist of the linear polymer of tetrahydrofuran, namely polytetramethylene ether.

The polyether segments can be made with terminal hydroxyl groups and joined through a linking radical, R, which is derived from a substance difunctional in reaction with hydroxyl. For example the substance may be a dicarboxylic acid or a latent diacid such as a diacid chloride or a diisocyanate. However, the linear polymer is more easily prepared and less liable to hydrolysis if the radical is linked to the segments through ether groups.

Thus, a preferred form of the elastomer comprises a copolyether containing sequences of tetramethylene ether units and cross-linked with sulphur.

This preferred elastomer may be made by copolymerising a major proportion of tetrahydrofuran with a minor proportion of a cyclic ether having a 3, 4 or 5 membered ring and an ester group of an inorganic acid, and reacting the substantially linear polymer made in this way, with sodium sulphide.

The class of cyclic ethers carrying ester groups is exemplified by the following compounds:

epichlorohydrin
epibromohydrin
β-chloroethyl glycidyl ether

The average molecular weight of the polyether segments is preferably greater than about 720 and advantageously in the range 1500 to 2500.

The catalyst for the polymerisation of the cyclic ethers is any of the well-known cationic initiators, for example $BF_3$, $SbCl_5$ and the co-catalysts $FeCl_3$ and $SOCl_2$.

The reaction of the substantially linear polymer with sodium sulphide may be effected in a number of ways, but when it is required to produce the elastomer as a shaped body, it is necessary that the majority if not all of the cross-links should form only after the polymer has been shaped. For example in forming filaments of the elastomer it is possible to extrude the polymer into contact with a hot solution of sodium sulphide, in which case the cross-linking action takes place in the filaments of the polymer.

In a more convenient process a solution of a substantially linear polymer having polyether segments linked by radicals carrying side chains consisting of sulphur terminating in a monovalent cation, is extruded into a coagulant to form filaments, the polymer then cross-links, forming the elastomer.

The soluble linear polymer is represented partially by the formula:

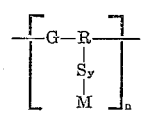

where M is the monovalent cation, for example hydrogen, sodium or potassium, and $y$ is an integer.

We are uncertain of the mode of inter-reaction of the side chains which consist almost entirely of sulphur. It was thought that the chains would combine in an oxidising environment and indeed, spinning the polymer solution into a coagulant containing hydrogen peroxide is easy. However, we have also spun into coagulants, for example tap water, which contained no peroxide, and even distilled water which contained neither peroxide nor molecular oxygen in any appreciable amount, and obtained filaments which at the time of testing had tensile properties comparable with the filaments formed in contact with peroxide. The threads in all cases were stored for a time under water and then dried in air and it is probable that the drying process is necessary to complete the cross-linking which occurs incipiently during the coagulation step.

The sulphur-containing linear polymer may be derived from the inorganic-ester-containing polymer by reaction with an alkali metal sulphide, according to the equation:

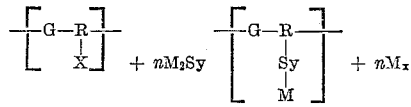

It is necessary to preserve the solubility of the polymer in the spinning solvent and, therefore, the number of cross-links must be kept low. To this end an excess of alkali metal sulphide must be used. It is advisable to use at least twice the stoichiometric amount based on the equation given above, and as the frequency of the inorganic ester groups in the reactant polymer is increased, an increase in the excess of the metal sulphide up to, say, a four-fold excess might be necessary.

The reaction of the ester-containing polymer and the alkali metal sulphide is best carried out with the reagents dissolved in the liquid components of an emulsion or in a common solvent, for example, aqueous ethanol. In some instances, depending on the nature of the liquid vehicle for the reaction, the excess alkali metal sulphide may be recovered, at least in part, from the heavy aqueous layer which separates from the polymer solution.

The reaction is time dependant and can be accelerated by heat.

The cross-linked elastomeric filament obtained as a result of spinning the polymer solution into a coagulant, has a greater elastic range but on the whole a lower initial modulus as the frequency of the cross-linked is reduced.

The invention is illustrated by the following examples in which parts are by weight.

EXAMPLE 1

(a) *Preparation of polymer containing inorganic ester groups*

887 parts of tetrahydrofuran were mixed with 113 parts of epichlorhydrin and stored in a glass vessel, under nitrogen, at 0° C. 10 parts of a $BF_3$/ether complex was added to the mixture which then remained undisturbed at between 0° C. and 10° C. for 3 days. At the end of this time, the mixture was diluted with tetrahydrofuran and poured into water, precipitating the polymer. The polymer was redissolved in ether and the solution washed three times with water. The ethereal solution was dried over anhydrous sodium sulphate and finally, evaporated to dryness. The yield was 790 parts of a polymer having an intrinsic viscosity of 0.64 measured at 0.5 percent concentration in tetrahydrofuran at 25° C. and a chlorine content of 4.3 percent.

(b) *Preparation of polymer having side chains containing sulphur*

13 parts of the chlorine-containing polymer were dissolved in 192 parts of hot ethanol and 42 parts of a 2.18 M solution of $Na_2S_4$ in water was added to the polymer solution. The mixture was refluxed for 4 hours. The resulting solution had a viscosity of 0.2 poise, and the polymer dissolved therein had a negligible chlorine content.

(c) *Spinning filaments and forming the elastomer*

The solution of the sulphur-containing polymer was extruded through a single hole having a diameter of 0.007 inch at the rate of 0.063 ml./minute, into a 20 percent solution of sodium chloride to form a filament which was subjected to a pull-off ratio (linear speed of take up at first godet: linear speed of polymer through the jet) of 1.96:1 and collected at 5 m./m. The filament was washed with water, collected on a bobbin and dried in air at room temperature (20° C. to 25° C.).

The dried filament had a tenacity of 0.12 gram/denier and an elongation of 266 percent, with 98 percent recovery within 1 second of being released from a near-maximum elongation.

EXAMPLE 2

17 parts of the chlorine-containing polymer prepared as in Example 1, was dissolved in 222 parts of ethanol and 51 parts of a 1.14 M solution of $Na_2S_4$ in alcohol was added. The mixture was heated for 4 hours at 75° C. and filtered to remove some free sulphur formed in the reaction. The mixture was then concentrated until 130 parts of a solution of the sulphur-containing polymer remained.

This latter solution was spun into a filament using the technique described in Example 1. The dry filament had a tenacity of 0.22 gram/denier and an elongation of 250 percent.

A portion of the dried filament was stretched by 100 percent and held at this length whilst being submitted to a temperature of 120° C. for 1 hour in air. As a result of this treatment, the properties of the filament changed to a tenacity of 0.54 gram/denier and an elongation of 180 percent.

EXAMPLE 3

The procedure used in Example 1 for the preparation of the chlorine-containing polymer, was followed in reacting 941 parts of tetrahydrofuran and 59 parts of epichlorhydrin in the presence of 10 parts of the $BF_3$/ether complex. The resulting polymer had an intrinsic viscosity of 0.735 and a chlorine content of 2.3 percent.

A solution of 18 parts of the polymer in 100 parts of ethanol was diluted with 18 parts of a 2.35 M solution of $Na_2S_4$ in water. The mixture was heated at 70° C. for 2 hours, centrifuged to remove excess polysulphide solution and then spun into 2 percent aqueous sulphuric acid through a jet hole of 0.007 inch diameter. The extrusion rate of the solution was 1.23 ml./minute, the pull-off ratio 1:1 and the collection speed 5 m./m. The filament was washed with water, collected on a bobbin and air-dried. The tenacity of the dried filament was 0.16 gram/denier and the elongation 437 percent.

EXAMPLE 4

A solution of 33 parts of the chlorine-containing polymer prepared as in Example 3, in 160 parts of ethanol containing 22 parts of 2.35 M solution of $Na_2S_4$ in water, was heated at 70° C. for 3 hours. After the solution had been centrifuged to separate and remove the excess aqueous polysulphide solution, the remaining polymer solution was spun through a jet hole having a diameter of 0.005 inch into a bath of water. The extrusion rate was 0.063 ml./minute, the pull-off ratio was 1:1, the collection speed 5 m./m. and the washed and dried filament had a tenacity of 0.24 gram/denier and an elongation of 424 percent.

EXAMPLE 5

A solution of 32 parts of the chlorine-containing polymer prepared as in Example 3 in 103 parts of ethanol was mixed with 21 parts of 2.35 M solution of $Na_2S_4$ in water and heated to from 70° C. to 75° C. for 45 minutes. The resulting solution was cooled to 20° C., centrifuged and then spun into water through a 0.005 inch diameter hole. The extrusion rate was 0.126 ml./minute, the pull-off ratio 0.5:1, the collection speed 5 m./m. The washed and dried filament had a tenacity of 0.25 gram/denier and an elongation of 667 percent.

EXAMPLE 6

A solution was prepared by heating together 94 parts of the chlorine-containing polymer as prepared in Example 3, 33 parts of ethanol and 63 parts of 2.35 M aqueous $Na_2S_4$ solution, at 70° C. for 1 hour. After centrifuging to remove excess polysulphide in aqueous solution, the solution was extruded through a 0.005 inch diameter hole into 2 percent hydrogen peroxide solution. The extrusion rate was 0.063 ml./minute, the pull-off ratio 5:1 and the collection speed 25 m./m. The washed and dried filament had a tenacity of 0.27 gram/denier and an elongation of 636 percent.

When the hydrogen peroxide solution was replaced by distilled water, as the coagulant in the spinning process, the filament produced had a tenacity of 0.45 gram/denier and an elongation of 680 percent. The initial modulus of this filament was 0.18 gram/denier.

EXAMPLE 7

A mixture of tetrahydrofuran (326 parts) and epichlorhydrin (22 parts) was polymerised at 0° C. using a complex (1 part) of triphenylmethyl chloride and antimony pentachloride as catalyst. The product had an intrinsic viscosity of 0.98 and a chlorine content of 2.2 percent.

A solution of the polymer (63 parts) in ethanol (447 parts) was stirred with an aqueous 3.7 M $Na_2S_2$ solution (38 parts) at 75° C. for 1 hour. After cooling and centrifuging, the resulting solution had a viscosity of 5.9 poises.

The dope was extruded through a 5 hole jet, each hole of 5 mille diameter, into a bath containing 5 percent hydrogen peroxide at 15° C. The extrusion rate was 0.62 ml./minute, the pull-off ratio 0.51 and the collection speed 5.0 m./m. After washing with cold water and drying, the yarn had a tenacity of 0.40 gram/denier and an elongation of 616 percent.

By stretching the yarn 120 percent immediately after it emerged from the spin bath, the tenacity was increased to 0.87 gram/denier.

EXAMPLE 8

813 parts of tetrahydrofuran and 106 parts of β-chloroethyl glycidyl ether were copolymerised under $N_2$ at 0° C. to 10° C. using 11 parts of boro-trifluoride etherate as catalyst. After 16 hours the product was isolated and purified as described in Example 1. The yield was 550 parts of a polymer with an intrinsic viscosity of 0.97 and a chlorine content of 2.6 percent.

107 parts of the polymer were dissolved in 1620 parts of hot ethanol and heated with 135 parts of 3.7 M $Na_2S_2$ solution at 75° C. for 6 minutes. The resulting solution was concentrated by distilling off 640 parts of ethanol under reduced pressure, and after centrifuging to remove suspended matter had a viscosity of 10.2 poises.

The alcoholic solution of the sulphur-containing polymer was extruded through a hole of 0.005 inch diameter into a bath of 5 percent hydrogen peroxide. The extrusion rate was 0.128 ml./minute, and the wind up speed 5 m./m. After washing with water and drying, the filament had a tenacity of 0.28 gram/denier, elongation 306 percent, elastic recovery 100 percent.

EXAMPLE 9

8 parts of a $BF_3$/ether complex was added to a mixture of 900 parts of tetrahydrofuran and 100 parts of epichlorhydrin stored in a glass vessel under nitrogen and at 0° C. The mixture was maintained undisturbed at a temperature between 0° C. and 10° C. for 3 days. At the end of this time, the mixture was diluted with tetrahydrofuran and poured into water to precipitate the polymer, which was then redissolved in ether and the solution washed several times with water. Finally, the ether solution was dried over anhydrous sodium sulphate and evaporated to dryness. The yield was 765 parts of a polymer having an intrinsic viscosity of 0.61 measured at 0.5 percent concentration in tetrahydrofuran at 25° C.

5 parts of the copolymer was dissolved in 4 parts of ethanol and 0.27 part of a 4 N aqueous solution of $Na_2S_4$ was added. The mixture was stirred until it was homogeneous and then heated to 80° C. for 10 minutes. The mixture at this stage was extruded to form filaments which were cured by heat at 130° C. for 2 hours. The cured filaments were able to recover from elongations of 1200 percent.

What is claimed is:

1. An elastomer consisting essentially of units having the structural formula

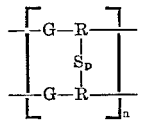

in which G is a linear segment having a molecular weight between 720 and 2500 and consisting essentially of residues of cyclic ethers having from 3 to 5 membered rings, R is a radical having from 3 to 5 carbon atoms derived from epichlorhydrin, epibromohydrin or β-chloroethyl glycidyl ether and connected to the G segment through ether or ester linkages and p and n are positive integers.

2. An elastomer as claimed in claim 1 in which G is a polytetramethylene group.

3. An elastomer as claimed in claim 1 in which the polyether segment is joined to the radical, R, through an ether linkage.

4. A process for making an elastomer comprising reacting a linear polymer having the formula:

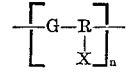

in which G is a segment having a molecular weight between 720 and 2500 and consisting essentially of residues of cyclic ethers having from 3 to 5 membered rings: R is a radical derived from epichlorohydrin, epibromohydrin or β-chloroethyl glycidyl ether and connected to the G segment through an ether or ester linkage; $n$ is a positive integer and X is chlorine or bromine, with sodium sulphide, to form an elastomer having the formula:

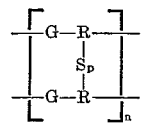

where $p$ is a positive integer.

5. A process for making an elastomer comprising reacting a solution of a linear polymer having the formula:

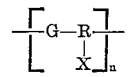

in which G is a segment having a molecular weight between 720 and 2500 and consisting essentially of residues of cyclic ethers having from 3 to 5 membered rings; R is a radical derived from epichlorohydrin, epibromohydrin or β-chloroethyl glycidyl ether and connected to the G segment through an ether or ester linkage; $n$ is a positive integer and X is chlorine or bromine, with sodium sulphide, to form a solution of a linear polymer having the formula:

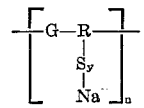

in which y is a positive integer, and extruding said solution into an aqueous coagulant to form a shaped body of an elastomer having the structural formula:

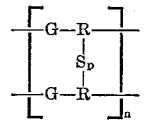

where $p$ is a positive integer.

6. A process as claimed in claim 5 in which the linear polymer is formed by copolymerizing tetrahydrofuran with a cyclic ether selected from the group consisting of epichlorhydrin, epibromohydrin and β-chloroethyl glycidyl ether, said polymer being a substantially linear polyether containing segments of polytetramethylene ether joined through radicals each carrying a halide ester group and derived from the cyclic ether, and comprising reacting the solution of the linear polyether with sodium sulphide to form a substantially linear polymer having sulphur containing side chains and extruding the solution into an aqueous coagulant, thereby condensing molecules of the linear polyether to form the elastomer.

7. A process as claimed in claim 6 in which at least twice the amount of sodium sulphide stoichiometrically required to introduce the sulphur containing side chains is reacted with the ester-containing linear polymer.

8. A process as claimed in claim 6 in which the aqueous coagulant comprises hydrogen peroxide.

References Cited

UNITED STATES PATENTS 3,313,742  4/1967  Dursch _____ 260—2

FOREIGN PATENTS 834,158  5/1960  Great Britain.

DONALD E. CZAJA, *Primary Examiner.*

L. J. BERCOVITZ, *Examiner.*

M. I. MARQUIS, *Assistant Examiner.*